(12) United States Patent
Ireton

(10) Patent No.: US 6,488,296 B2
(45) Date of Patent: Dec. 3, 2002

(54) METHOD AND APPARATUS FOR SMALL WHEEL DISC BRAKE

(76) Inventor: Richard D. Ireton, 1030 Vale View Dr., Vista, CA (US) 92083

( * ) Notice: Subject to any disclaimer, the term of this patent is extended or adjusted under 35 U.S.C. 154(b) by 38 days.

(21) Appl. No.: 09/854,074

(22) Filed: May 10, 2001

(65) Prior Publication Data

US 2002/0043777 A1 Apr. 18, 2002

Related U.S. Application Data

(63) Continuation-in-part of application No. 09/505,798, filed on Feb. 17, 2000, now abandoned.

(51) Int. Cl.$^7$ .................................................. B60T 5/00
(52) U.S. Cl. ............................. 280/87.042; 280/11.27; 280/28.11; 280/11.204; 280/11.211; 280/11.215; 188/72.9
(58) Field of Search ........................... 280/11.2, 11.27, 280/841, 11.19, 87.042, 28.11, 11.204, 11.212, 11.211, 11.215; 188/72.9

(56) References Cited

U.S. PATENT DOCUMENTS

| | | | | |
|---|---|---|---|---|
| 2,953,389 A | * | 9/1960 | Green et al. | 280/87.04 |
| 4,055,234 A | | 10/1977 | Burton | 1/30 |
| 4,076,266 A | * | 2/1978 | Krausz | 280/87.04 |
| 4,183,546 A | * | 1/1980 | Heilig | 280/87.04 |
| 4,295,547 A | * | 10/1981 | Dungan | 188/2 |
| 4,805,936 A | * | 2/1989 | Krantz | 280/842 |
| 5,020,621 A | * | 6/1991 | Martin | 180/181 |
| 5,197,575 A | * | 3/1993 | Mangum et al. | 188/72.9 |
| 5,251,934 A | * | 10/1993 | Gates | 280/842 |
| 6,230,850 B1 | * | 5/2001 | Huang | 188/24.21 |
| 6,276,700 B1 | * | 8/2001 | Way et al. | 280/87.01 |

* cited by examiner

*Primary Examiner*—J. J. Swann
*Assistant Examiner*—J. Allen Shriver

(57) ABSTRACT

An improved small wheel disc brake for skateboards, scooters, and carts, which facilitates a heat management design to provide higher level of performance operation without brake failure thereby improving the safety of said vehicles. The disc brake (6) includes a non-metallic friction pad disc (18) which is fixed to the central aperture of a wheel hub (28), (FIG. 1) and a matching non-turning rotor (24) that is slideable linked to a hub (16) that is made apart of an axle support structure (17). The non-turning rotor (24) is controllably coupled with the friction pad disc (18) by means of cam levelr (13), which is a pivotally attached to the axle support structure (17) by an attachment bolt (15). A means is provided for remotely activating the mechanism, which includes a Bowden cable (8), wire (9) and handgrip (10). The friction pad disc (18) provides for efficient brake action and smooth modulation while insulating wheel components from frictional heat associated with braking. The non-turning rotor (24) conducts frictional heat directly into said axle support structure (17), which provides for rapid dissipation of heat by means of air-cooling.

8 Claims, 2 Drawing Sheets

METHOD AND APPARATUS FOR SMALL WHEEL DISC BRAKE

This is a continuation in part of Application Ser. No. 09/505,798 filed Feb. 17, 2000 now abandoned.

FIELD OF THE INVENTION

The invention relates to a brake device for small-wheeled vehicles such as skateboards, scooters, small carts and the like. The brake can be actuated by a mechanical or hydraulic system and activated by means of a remote actuator.

DESCRIPTION OF THE PRIOR ART

Over the past 50 years inventors have developed a variety of brake systems for small-wheeled vehicles. They range from the very crude stick into the ground to a finely designed hydraulic system featuring a remote handgrip. Prior art presented has proven adequate for operation by children and adults at relatively slow speeds. However, prior art does not provide a brake mechanism that will withstand self-generated heat forces when operated by an adult rider at speeds exceeding 15 mph for any length greater that ¼ mile with a downhill inclination greater than 4 degrees. The problem lies within frictional heat generated by a brake mechanism when trying to stop an adult rider traveling under the force of gravity over a period of time.

The force required to slow or stop a rider on a wheeled vehicle is dependent upon the weight and velocity of the rider, and the angle of inclination of the run. Increasing any of these heel variables increases the amount of force required to stow the rider. The consequence of using frictional force to slow a vehicle is heat generation. As a rider travels downhill and applies brake pressure in order to control speed, frictional heat continually builds into the brake mechanism. Considering this heat is localized to the surface area of a small wheel, the amount of heat can be substantial Testing has shown that during normal recreational use a 180 pound rider traveling on a skateboard equipped with a brake at 15–20 mph for a distance of ½ mile with a downhill inclination of 4–6 degrees will generate brake temperatures between 250° F. and 350° F. Larger riders traveling a longer distance, such as a mile, can generate brake temperatures in excess of 500° F. Urethane and rubber wheels are heat sensitive and will soften to a point of deformation at a temperature of 225° F. As temperatures rise to 300° F. wheels lose the resilient integrity required to maintain their form and can no longer support the rider. Given the use of small-wheeled vehicles by adult riders, heat generated by the brake must be given design consideration to provide for safe, reliable operation over prolonged use.

The invention disclosed was developed over a period of several years by testing various methods for braking small wheel vehicles such as skateboards and small carts. Methods that were tested include drag brakes of various designs, and mechanisms that apply frictional pressure to the wheel surface, The drag brake proved ineffective at delivering enough braking force to slow an adult rider at speeds in excess of 15 mph. A variety of mechanisms were devised tat applied frictional pressure directly to the wheel surface. These mechanisms proved to be ineffective due to heat build up at the wheel. During operation, frictional heat would melt wheels leaving the rider in a perilous condition. Therefore, it became apparent that the materials used to resist frictional force were just as important as the application of force itself. For our application, a mechanism needs to provide enough braking force to slow a small wheeled vehicle carrying an adult rider at speeds in excess of 40 mph without melting the wheels or damaging the brake mechanism. The following is a list of desired operational specifications:

1) The brake needs to be readily adaptable to common wheel axles and commercially available small wheels.
2) The brake must operate to a rider's expectations. Specifically, the brake should operate in a smooth and reliable manner over a minimal distance of at least a mile while traveling downhill at w s ranging from 0–40 mph. An adult rider would be defined as a body having a weight of approximately 180 pounds.
3) The mechanism is preferably hand operated to provide a well regulated and smooth slowing of the vehicle. Hand operation leaves riders feet unencumbered to provide for maximum stability and control.
4) The brake has to effectively transfer frictional heat, generated during operation, away from heat sensitive wheel hubs and tires and into an axle support structure that will not be damaged by thermal loading. Heat must then be effectively convected away from this structure to provide cooling for the brake.
5) The brake must provide thermal insulation for wheels for maximum durability.
6) The brake mechanism must be scaleable to accommodate different size wheels, axles, vehicles riders, hills and performance needs.
7) The mechanism would need to be of a reliable, durable, unobtrusive design that is easy to maintain and repair.

The brake mechanism described herein has been extensively tested on a variety of vehicles, under a variety of operational conditions and has achieved all of the above operational specifications.

Prior art has not provided design consideration for frictional heat generated during brake operation. An example of this is found in U.S. Pat. No. 4,076,266 to Krausz (1978). The Krausz art provides a brake mechanism that utilizes a piston that seats a friction member at it's end, which bears against a brake disc fitted to the inside face of a wheel. When activated, the friction member is brought into contact with the spinning brake disc, which is in direct contact with the wheel. She friction member is intrinsically non-conductive and therefore stops frictional heat from entering the axle support structure. Therefore, as a rider travels downhill and frictional force is applied to the wheel, frictional heat loads directly into the brake discs and then into the wheels. When the brake disc and wheel reaches a temperature of 225° F. the wheel begins to soften to a point of deformation and starts to melt. The Krausz art does not provide for a place for heat to move into apart from the brake disc and wheel. Krausz did not recognize heat as being an issue of concern as evidenced by the use of the friction member and lack of mention within the art In addition, the Krausz art specifies the fiction member to be limited in size to the diameter of the engaging piston. This limitation does not provide adequate frictional surface area to effect braking force necessary to stop an adult rider traveling under the influence of gravity at any speed greater than 10–15 mph.

In addition, the Krausz art specifies the piston to provide frictional force offset from the axle. This provides an unequal force upon the brake disc and wheel, which tends to bend the axle. This design problem leads to excessive wear of the brake disc, moving additional friction heat into the brake disc and wheel. The Krausz art would not be considered safe for operation by anyone other than a small child at a very slow speed. Another example is discussed within U.S. Pat. No. 4,295,547 to Dungan. The Dungan art describes two separate means of braking a small wheel vehicle. In both instances the art provides for a friction member to apply frictional pressure to a disc attached to the wheel face, whereby isolating frictional heat from the axle support structure. Frictional heat generated during brake operation is directed into the brake discs and the wheel face, as does the Krausz art. The Dungan art provides for an annular friction member, which is an improvement over the Krausz art, however, Dungan, like Krausz does not provide design consideration for frictional heat generated during operation. During normal operational use, frictional heat is directed into the wheels until such time as the wheel temperature reaches 225° F., and begins to melt, placing a rider in a dangerous situation. This temperature can be reached within a distance of 100 feet. In addition, proper design of a small wheel brake involves not only making provision to insulate the wheels from frictional heat, but also to provide a location for heat to reside that will not be damaged by thermal loading. This location should be able to withstand temperatures exceeding 500° F. and provide for ideal convection of heat into the air.

Given the high performance nature of existing vehicles, miles of open terrain and the growing popularity of Gravity Games and Extreme Games, riders are traveling faster and further than ever on vehicles without a reliable means of braking or slowing. Small wheel vehicle enthusiasts are injuring themselves due to the lack of brake mechanism that will withstand self-generated heat over a reasonable distance of operation without brake failure.

Clearly, the invention presented herein provides many advantages over the prior art noted above. The treatment of the large amount of generated heat from friction based braking systems stands as the paramount issue in small wheeled brake systems. Urethane and rubber wheels melt at substantially lower temperatures than the other metal components. Surprisingly, prior art noted above focuses heat created in the braking process directly on the wheel, the most heat sensitive component of the brake. No consideration has been provided for frictional heat or the consequences of wheel melt down when used by an adult rider at a modest speed. Prior art can only be considered safe when operated by small children or adults at very low speeds.

OBJECTS AND ADVANTAGES

The most fundamental objects and advantages of the invention are:

a) to provide a brake mechanism that effectively transforms kinetic energy from spinning wheels into heat and then moves that heat to a place that will not be damaged by thermal loading;

b) to utilize a new method for braking small wheel vehicles whereby a heat resistant friction pad disc is made a part of the inside face of a wheel hub and is used to insulate the wheel from frictional heat generated during the brake process;

c) to utilize a new method for braking small-wheel vehicles that includes a non-turning rotor that is mounted facing and substantially matching the friction pad disc;

d) to utilize a new method of braking small wheel vehicles whereby the non-turning rotor affects braking forces and conducts heat generated during brake operation into itself;

e) to utilize a new method for braking small-wheel vehicles whereby frictional heat generated during brake operation is conducted into the non-turning rotor and axle support structure;

f) to provide a brake mechanism that includes an axle and support structure able to withstand temperatures within a range of 250° F.–500° F. and safely convect that heat into the air, g) to provide a brake mechanism whereby said axle support structure includes a square hub located at it's end, centered along the axle;

h) to provide a brake mechanism whereby said non-turning rotor is mechanically linked to an axle support structure by a square hub;

i) to provide a brake mechanism whereby said axle support structure includes an axle that extends outward from the hub, of sufficient size and length to support at least one wheel;

j) to provide a brake mechanism whereby the axle support structure provides linear movement for said non turning rotor when activated by a mechanical or hydraulic system;

k) to provide a brake mechanism whereby the non-turning rotor applies equilateral pressure to the friction pad disc and wheel assembly affecting brake action;

l) to provide a brake mechanism that includes a cam lever of sufficient length to provide equilateral leverage force upon the non tuning rotor at equal but opposite axis points;

m) to provide a brake mechanism that may include an arm extension attached to the cam lever for the purpose of adjusting the Bowden cable attachment location;

n) to provide a brake mechanism that includes a wheel, wheel hub assembly and means for securing said wheel hub assembly to the axle support structure;

o) to provide a disc brake mechanism that may be activated by a variety of means including a Bowden cable and wire, or a hydraulic system or mechanical linkage;

p) to provide a brake mechanism that may be used for one or more wheels of a vehicle;

q) to provide a disc brake mechanism whereby wheels may be activated dependently of one another and receive equal braking pressure;

r) to provide a disc brake mechanism whereby brakes may be activated independently of one another;

s) to provide a disc brake mechanism with returns to a normally non-activated position by means of a spring;

t) to provide a disc brake mechanism that is actuated by a foot or hand lever;

u) to provide a disc brake system whereby one or more mechanisms may be activated in unison from a single brake actuator;

v) to provide a mechanism that is readily adaptable for small vehicles such as skateboards, scooters and small carts;

Further advantages of the brake mechanism disclosed include; the ability to retrofit common skateboard trucks, scooters and carts with a disc brake system that will provide riders of all sizes with a high level of safety and brake performance. Further objects and advantages will become apparent from a consideration of the ensuing description and drawings.

SUMMARY, RAMIFICATION AND SCOPE

The disc brake mechanism provided herein offers riders a new level of brake technology for small wheel vehicles that hereto now has not been available. The brake mechanism is designed with components that will produce and withstand braking forces necessary for slowing or stopping an adult rider traveling at speeds in excess of 50 miles per hour. Frictional heat generated during the brake process is conducted away from heat sensitive wheel components and directed into the axle support structure where it is safely dissipated into the air.

A notable feature of the brake is the use and location of a non-metallic friction pad disc, which is fixed to the central aperture of the wheel hub. Locating the friction pad disc on the wheel hub provides an unobstructed path for heat to naturally move into the non-turning rotor and axle support structure.

Furthermore, the friction pad disc embodies other advantages in that:

it is porous and thereby adheres well to the wheel hub or a fixture which is attached to the wheel hub by a heat resistant epoxy adhesive;

it is nonconductive, thereby providing thermal insulation for the wheel hub;

it is constructed of a durable, light weight, heat resistant material;

it provides for a large braking surface area;

it is designed to operate under conditions being imposed;

it spins with the wheel, which provides for added cooling;

it may be inset into the wheel hub making it unobtrusive;

it provides riders with a smooth brake modulation;

it is readily available in a variety of formulations and densities.

The brake mechanism has numerous advantages over prior art including; a natural heat management system which helps to maintain the integrity of the wheels, a large friction pad surface area which provides for efficient long lasting operation, and smooth predictable modulation for the rider. The brake has few moving parts, is compact by design and is cost effective to manufacture. The brake is readily adaptable to existing skateboard trucks, scooters, skates and carts. The mechanism may be operated as a stand-alone unit or may be connected to multiple brake assemblies with a simple Bowden cable and wire assembly.

The disc brake presented herein will provide gravity sport enthusiasts wit a superior means of controlling and stopping their vehicles. There are many areas, roads, trails and slopes that are ideal for downhill recreation, that hereto now would be considered to be too dangerous to ride because of the degree of inclination and lack of means for slowing down or stopping. The brake presented herein will provide riders of all age and sizes with reliable speed control necessary to safely navigate and play in these areas for a great new form of recreation.

Although the description above contains many specifics, these should not be construed as limiting the scope of the invention but as merely providing illustrations of some of the presently preferred embodiments of this invention.

Figure 3:
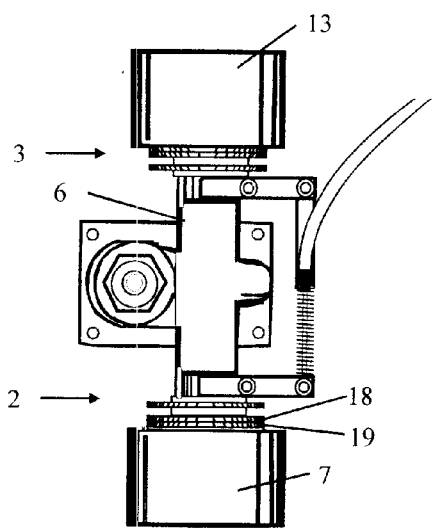
FIG. 3 is a view from above showing the disc brake assembly in a non-actuated configuration.

| REFERENCE NUMERALS IN DRAWINGS | | | |
|---|---|---|---|
| Number | Description | Number | Description |
| 1 | Conventional skateboard | 2 | Left disc brake |
| 3 | Right disc brake | 4 | Deck |
| 5 | Front truck | 6 | Dual action disc brake |
| 7 | Wheel | 8 | Bowden cable |
| 9 | Wire | 10 | Handgrip |
| 11 | Spring | 12 | Arm extension |
| 13 | Cam lever | 14 | Pivot hinge |
| 15 | Attachment bolt | 16 | Square hub |
| 17 | Axle support structure | 18 | Friction pad disc |
| 19 | Heat Resistant Adhesive | 20 | Frictionless bearing |
| 21 | Axle | 22 | Nut |
| 23 | Mounting plate | 24 | Non-turning rotor |
| 25 | Cable stop | 26 | Wire attachment fastener |
| 27 | Bearing spacer | 28 | Wheel hub |

DESCRIPTION OF THE PREFERRED EMBODIMENTS

Figure 4:
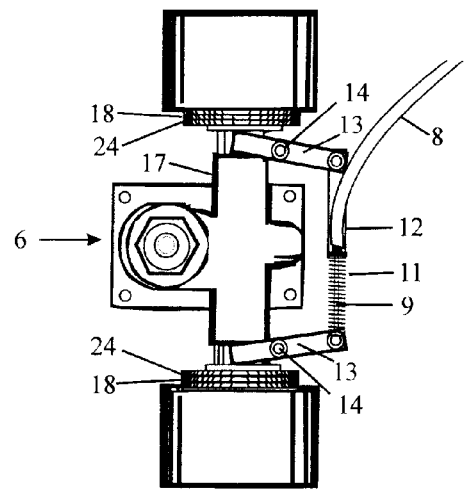
FIG. 4 is a view from above showing the brake assembly in an actuated configuration.
Figure 1:
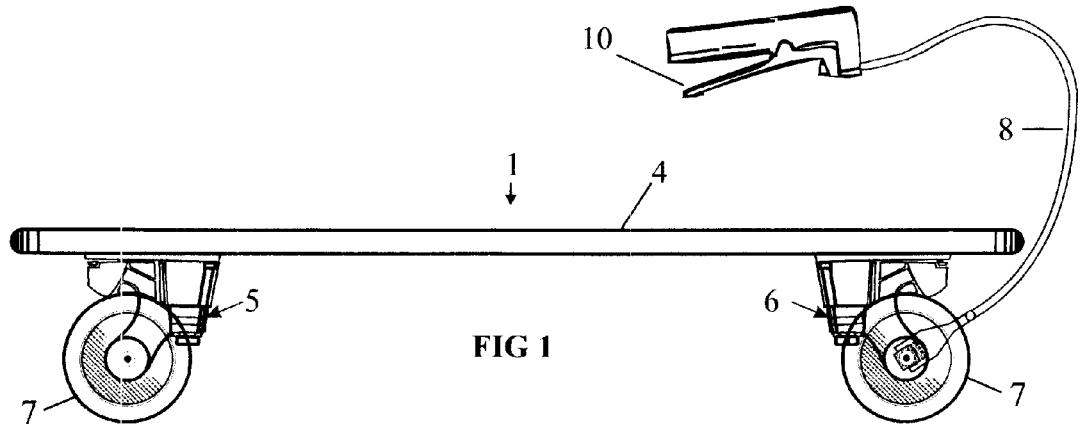
FIG. 1 is a side view of a skateboard with an embodiment of the disc brake mechanism.
Figure 2:
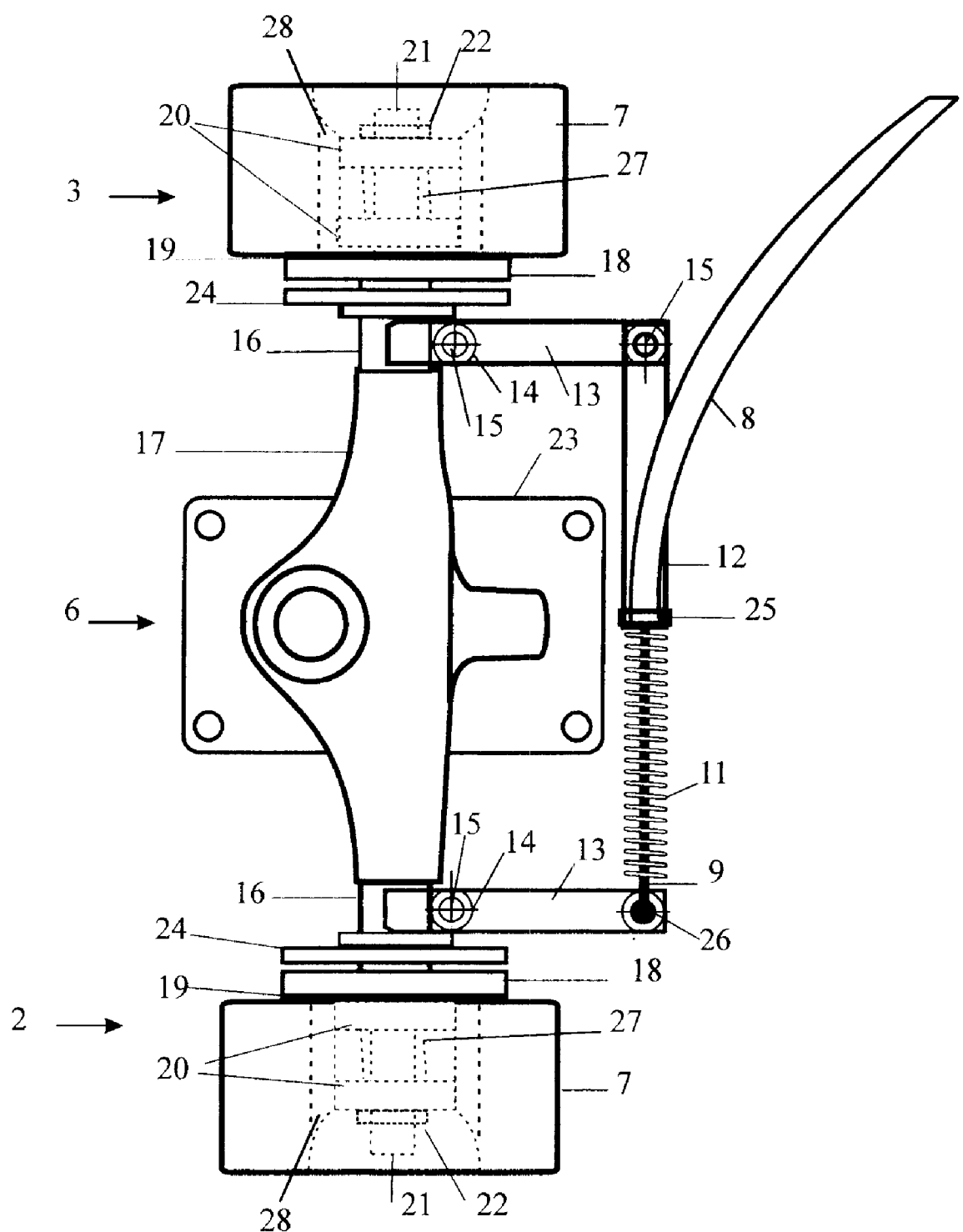
FIG. 2 is a plan view of the disc brake mechanism.

The disc brake mechanism presented herein can be adapted for a variety of small wheel vehicles. For reason of explanation, a standard skateboard truck is illustrated using two embodiments of the brake disclosed The two embodiments are referred to as a dual-action disc brake. Referring to FIG. 1, a conventional skateboard 1 is shown that includes: a deck 4, a dual-action disc brake 6, coaxial wheels 7, and a means for the rider to remotely activate the brake using a Bowden cable system 8, and handgrip 10. The board operates, as does a standard skateboard with the exception that the rider holds a hand lever 10 to remotely activate the brake 6 when desiring to slow down or stop. In FIG. 3 the dual-action disc brake 6 is shown in a normally non-actuated configuration. wheels 7, which include friction pad discs 18, spin freely from non-turning rotors in this configuration. In FIG. 4 the dual-action disc brake 6 is shown in an activated configuration. A rider activates the brake 6 by squeezing the handgrip 10, which draws a wire 9 into the cable sheath 8. This action causes cam levers 13 to be pulled together with equal pressure at pivot hinges 14 providing an equal, leveraged force upon slideable, non-turning rotors 24. As non-turning rotors 24 become frictionally engaged with friction pad disc's 18, brake action is provided relative to the amount of force applied to hand grip 10. The spring 11 returns and maintains the mechanism in a normally non-actuated configuration as illustrated in FIG. 3. In FIG. 2, the dual-action disc brake mechanism 6 is shown in a non-activated configuration. Each disc brake mechanism 2, 3 includes a hub 16, which is made apart of an axle support structure 17. The hub 16 provides a means for mechanically linking the non-turning rotor 24 to the axle support structure 17 while allowing for slideable movement of the non-turning rotor 24. There are a variety of means for lining the non-turning rotor 24 to the axle support structure 17 including: a square hub 16 shown, or a splined shaft, or an irregular shaped shaft not shown. The square hub 16 is located on each end of the axle support structure 17 at the central axis of the axle 21, The non-turning rotor 24 includes a borehole matching that of the square hub 16 at its central aperture, thus providing a linear movement along the square hub 16. In addition, the non-turning rotor, or section thereof 24 is formed to match the diameter of the friction pad disc 18. This provides for ideal brake performance, modulation and heat conduction during brake operation. The non-tuning rotor 24 may be leveraged into the friction pad disc by a variety of means including a cam lever 13 shown, or a rotary screw, or a hydraulic actuator, or mechanical linkage not shown. The cam lever 13 is pivotally attached to the hub 16 by an attachment bolt 15 and pivot hinge 14, which is attached to one side of hub 16. The cam lever 13 is forked at one end to provide equilateral pressure on the non-turning rotor 24 when activated by the rider. The cam lever 13 provides a leverage force on the non-turning rotor 24 causing it to become controllably engaged with the friction pad disc 18 and wheel 7. The end of cam lever 13 is provided with a means for connecting an arm extension 12 or cable wire 9. Extending or reducing the length of the cam lever 13 will adjust leverage force available to riders.

Extending out from each end of the axle support structure 17 is a wheel-bearing axle 21. The axle supports a wheel assembly which includes a wheel hub 28, wheel 7, frictionless bearings 20, bearing spacer 27, and friction pad disc 18 which is fixed to the central aperture of wheel hub 28. The friction pad disc 18 is formed of a non-conductive commercial grade friction material and may be affixed using a heat resistant epoxy adhesive 19 common to the automotive industry.

The mechanism may be activated by a variety of means including a Bowden cable 8 and wire 9 as shown, a hydraulic system or a mechanical linkage system not shown. Referring now to the cable system shown, a Bowden cable 8 of the type having an outer sheath with a sliding wire cable 9, which is operated by means of a handgrip 10, (FIG. 1) which causes a wire 9, to be retracted into the sheath 8 when handgrip 10 is squeezed. The sheath terminates at cable stop 25, which is made apart of arm extension 12. The arm extension 12 is attached to cam lever 13 by attachment bolt 15. The cable wire 9 passes threw a bore in the cable stop 25, spring 11, and a bore in wire attachment fastener 26, securing the cable to cam lever 13.

When activated, cam levers 13 apply equilateral pressure against the non-tuning rotors 24 causing them to become controllably coupled with friction pad discs 18. The pressure against the non-turning rotors 24 applies an outward force on the wheel hubs 28, wheels 7, frictionless bearings 20, spacers 27 and nuts 22. The wheel hub 28, bearings 20, and spacers 27 are firmly secured to the axle support structure and resist this force by nuts 22 located at each end of the axle. The axle support structure 17, which includes square hubs 16, non-turning rotors 24, and mounting plate 23 resists rotational forces imposed from the friction pad discs 18, spinning wheels 7, and any given load.

The friction pad disc 18 is made from a non-conductive material and is therefore less conductive than the metallic non-turning rotors 24. Therefore, heat generated during the brake operation is naturally drawn away from the wheels and into the very conductive axle support structure 17 where it is dissipated into the passing air. A further level of insulation and heat dissipation is provided by the spinning wheels.

I claim:

1. A disc brake mechanism for small-wheeled vehicles comprising:

a carriage that has an axle support structure with wheels mounted thereon that rotate freely and indent of one another so that said carriage can roll upon a surface;

a heat-resistant, friction pad disc that is fixed to the central aperture of a wheel hub and which rotates with said wheels;

a non-turning, heat-conductive rotor mounted to an axle support structure, wherein said non-turning rotor is controllably coupled with said friction pad disc to provide braking action;

means for exerting a force upon said non-turning rotor to engage said friction pad disc;

means for remotely act said disc brake mechanism;

a spring for maintaining said brake mechanism in a non-activated configuration; wherein said non-turning rotor and said friction pad disc are not in engagement;

wherein upon activation of said brake mechanism, frictional heat generated during braking operation is directed from said non-turning rotor into said axle support structure by conduction for dissipation, in of into the heat sensitive wheel components.

2. The disc brake mechanism of claim 1, wherein said non-turning rotor is formed to match said friction pad disc.

3. The disc brake mechanism of claim 1, wherein said non-turning rotor is slideably linked to said axle support structure by a variety of means including a square hub, a splined shaft or an irregular shaped shaft.

4. The disc brake mechanism of claim 1, wherein said non-turning rotor has a central aperture or borehole having a mechanical link to provide slideable movement along said axle support structure.

5. The disc brake mechanism of claim 1, wherein said non-turning rotor is slideably coupled with said friction pad disc by a variety of means including a cam lever, a rotary screw, a hydraulic actuator or a mechanical linkage.

6. The disc brake mechanism of claim 1, wherein said brake mechanism is remotely activated by a variety of means including a Bowden cable assembly, or a hydraulic system or mechanical link initiated by a handgrip or foot activation.

7. The disc brake mechanism of claim 1, wherein said friction pad disc provides thermal insulation for said wheel components during braking operations.

8. The disc brake mechanism of claim 1, wherein said non-turning rotor conducts frictional heat directly into said axle support structure providing rapid dissipation of heat by means of air cooling over the surface area of said axle support structure.

* * * * *

UNITED STATES PATENT AND TRADEMARK OFFICE
CERTIFICATE OF CORRECTION

PATENT NO. : 6,488,296 B2
DATED : December 3, 2002
INVENTOR(S) : Richard D. Ireton It is certified that error appears in the above-identified patent and that said Letters Patent is hereby corrected as shown below:

<u>Title page,</u>
Item [57], ABSTRACT,
Line 11, "levelr" should be -- lever --

<u>Column 1,</u>
Line 31, "heel" should be -- three --
Line 60, "tat" should be -- that --

<u>Column 2,</u>
Line 10, "w s" should be -- speeds --
Line 43, "She" should be -- The --

Signed and Sealed this

Second Day of March, 2004

JON W. DUDAS
*Acting Director of the United States Patent and Trademark Office*